Sept. 20, 1938.  D. D. COLEE  2,130,613
AUTOMATIC INDICATOR
Filed Jan. 9, 1937
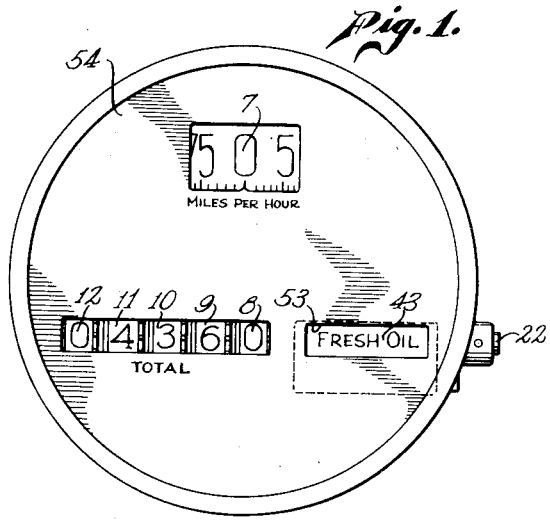
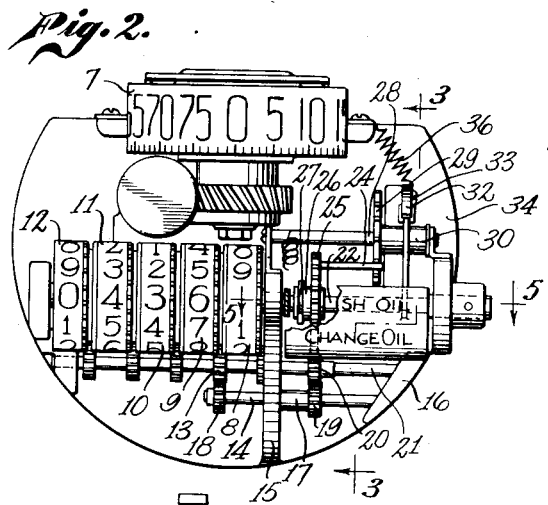
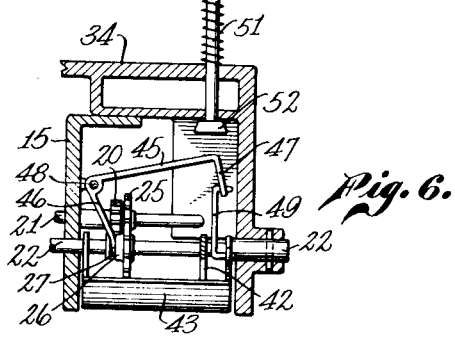
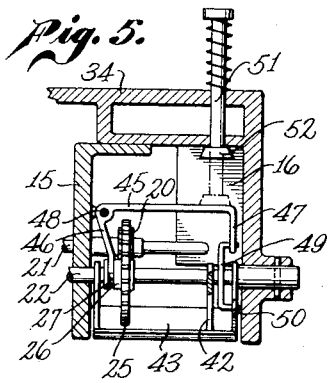
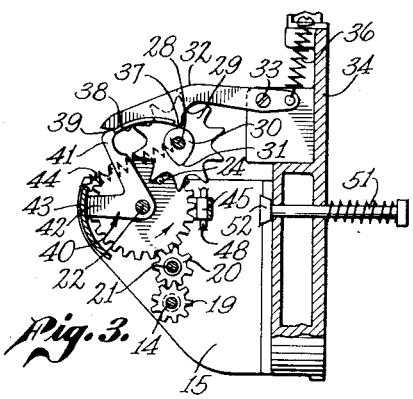
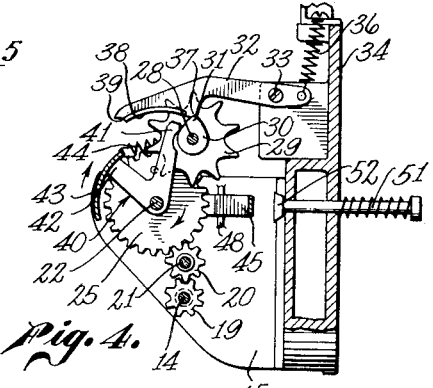
Inventor
Donald D. Colee
By Everett N. Curtis
Attorney Patented Sept. 20, 1938

2,130,613

UNITED STATES PATENT OFFICE 2,130,613

AUTOMATIC INDICATOR

Donald D. Colee, San Diego, Calif., assignor of one-half to Ralph H. Brauer, San Diego, Calif.

Application January 9, 1937, Serial No. 119,822

8 Claims. (Cl. 116—114)

My invention relates to automatic indicators, and its objects are to furnish an infallible reminder of necessary acts to be done after a predetermined automatic indication, to assure to the operator of a motor vehicle a positive indication of the time at which it is necessary for a change of oil in the crank case, or needed lubrication of any part of such motor vehicle, to furnish a convenient display of such indication on some accessible part of the dashboard, to utilize the mileage mechanism of an odometer in furnishing an improved attachment for indicating changes of oil and other lubrication at regular intervals, and in general to carry out these objects through a simple and effective construction and association of members and parts.

My invention is particularly adapted for use by the owner or driver of an automobile. As is well known, it is almost the universal habit of the ordinary operator of a motor vehicle to run over and forget the proper time for changing the oil in the crank case, or of taking care of other lubrication, so that the bearings are not lubricated at the proper and necessary intervals to prevent undue wear and friction. An important purpose, therefore, of my invention is to bring to the immediate attention of such operator, at the earliest possible moment, the fact that a change of oil or other lubrication is required. With such purpose in mind, I have devised means whereby such fact is ascertained and notation thereof displayed on the dashboard where such indication may be seen in company with other indicating dials in common use. Such dials being under the constant observation of the operator and serving at all times to secure the proper and efficient operation of the motor vehicle, the proper time for changing oil or other lubrication cannot escape attention.

Preferably for this purpose, I have devised a new and improved mechanism which I have connected in a novel manner to the usual tumbler construction of odometers used to indicate mileage on automobiles, whereby after a predetermined number of miles such as 1000, 1500, or 2000 miles, depending upon the make of car, the time for making the necessary lubrication may be shown on the dashboard.

Attention is hereby directed to the accompanying drawing, in which similar numerals of designation refer to similar parts throughout the several views, and in which—

Figure 1 is a view of the face plate of my improved indicator as it appears upon a motor vehicle dashboard;

Figure 2 is a side elevation of my improved device after the face plate has been removed, a part of the indicator display plate being shown broken away in order better to illustrate my improved attachment;

Figure 3 is a sectional view taken on line 3—3 of Figure 2 looking in the direction of the arrows;

Figure 4 is a view similar to that of Figure 3, showing the movable parts in changed position;

Figure 5 is a horizontal section taken on line 5—5 of Figure 2, looking at the same in the direction of the arrows after a quarter turn of my device toward the front; and Figure 6 is a view similar to that of Figure 5 illustrating the action of the tripping mechanism.

Referring to the drawing, I have shown in Figure 2, in association with my improved device, a common form of odometer, provided with a cylindrical display speed plate 7, and the usual mileage display tumblers 8, 9, 10, 11 and 12, arranged to indicate units, tens, hundreds, thousands and tens of thousands, respectively. In such mechanism, as is well known in the art, various gears are actuated by the said tumblers, one of which gears 13 is actuated by the tumbler 9, the indicator of tens of miles up to one hundred miles.

I preferably construct my improved device with the shaft 14 journalled in bearings in the standards 15 and 16, and secured against longitudinal movement by the collar 17. Upon the said shaft 14, I mount the gear 18, meshing with the gear 13 of the odometer aforesaid, and the gear 19 meshing with the idler gear 20 mounted to move freely upon shaft 21. Upon the main shaft 22, I mount the larger idler gear 25, to which is secured near the periphery thereof and at right angles thereto, the elongated finger 24. The said gear 25 is also provided with the hub 26, having therein the annular recess 27.

Upon the shaft 28, and rotating freely thereon, I mount the star wheel 29, provided with star points ten of which are shown, and which are so arranged as to come into successive contact with the end of the finger 24 and to be moved thereby accordingly. Since, as here shown, the arrangement of the gears 13, 18, 19, 20 and 25 is such that the gear 25 will make one complete rotation every 100 miles as indicated by the odometer, the star wheel 29 will advance, through contact with said finger 24 on said gear 25, the distance between star points with every such rotation, and will complete a full revolution every 1000 miles. If desired, this arrangement of gears, as is obvious may be modified so that the said star wheel may be caused to complete such revolution every 1500 or every 2000 miles, or at any other mileage desired.

Integral with said star wheel 29, or in any manner secured thereto, is the hub 30 provided with the lobe 31, which hub and lobe together perform the office of a cam in the manner hereinafter described. As will be observed, after one complete revolution of the wheel 29, the lobe 31 comes into contact with the tripping arm 32, pivoted at 33 to the odometer base 34, and having a short adjacent end attached to the base 34 by the spring 36. Such spring is of such character as to provide at all times sufficient tension means to keep the cam following point 37 of the arm 32 in intimate contact with the hub 30.

As shown, I provide the outer portion of the arm 32 with the guiding surface 38 and with the catch 39, in order to make contact with member 41 of the V shaped arm 40, which, at the angle thereof, is pivotally mounted on shaft 22, the other member 42 of said arm being secured to the indicating display plate 43. Normally the catch 39 is in contact with the member 41 as shown in Figure 3, but when the lobe 31 moves into the position shown in Figure 4, the outer portion of the arm 32 moves upwardly and the catch 39 is released, and the member 41 is moved into contact with the hub 30 by reason of the tension of spring 44 secured to said plate 43 and shaft 28, at which time the necessity for change of oil or need for lubrication is indicated. Upon said plate 43, I propose to display words indicating that the parts are sufficiently lubricated, and also words indicating that such condition is changed. I have therefore set forth the words "Fresh oil," which appearing through the elongated opening 53 in the plate 54, shown in Figure 1, indicate that the said normal situation is the case, and the words "Change oil" which, appearing through the said opening by the swinging of plate 43 on member 42 as above described, indicate that lubrication is required.

For the purpose of resetting my device in the position shown in Figure 3, after the indication of change as shown in Figure 4 and after proper lubrication has been effected in consequence of such warning or indication, I employ the mechanism illustrated in the drawing, and more particularly shown in Figures 5 and 6, in which I provide the member 45, which is pivoted at 48 to the standard 15, and has two downwardly extending arms 46 and 47. The lower end of the arm 46 is constructed to ride in the recess 27, and the lower end of the arm 47 is pivotally connected with one end of the connecting link 49, which is also pivotally connected with the ear 50 on the plate 43.

When the parts are tripped as shown in Figures 4 and 6, the movement of the ear 50, travelling with the plate 43, forces the arm 47 to move upwardly and causes the gears 20 and 25 to disengage by reason of the longitudinal movement of gear 25 on shaft 22, the said movement being accomplished through the engagement of the arm 46 with the recess 27. Thereafter to restore the parts to operative position, the spring plunger 51, mounted upon and extending through the main base 34, is employed. Through the manual depression of this plunger, the head 52 thereof is brought into contact with the member 45 and the same is forced downwardly into the position shown in dotted lines in Figure 5, at which time the gears 25 and 20 are reengaged, the plate 43 moved to its normal position and the member 41 restored to its catch 39.

Upon the various parts of my device resuming such normal position, there will appear, through the opening 53 of the face plate 54 on the dash board of the motor vehicle, the indication, "Fresh oil," as displayed on the outer surface of the plate 43. As the motor vehicle is driven, increase in mileage will be indicated and will accumulate on the odometer, and through the chain of gears communication therewith and above described, the star wheel 29 will slowly rotate carrying with it the hub 30 and the lobe 31. When the maximum number of miles has been reached denoting the time for lubrication, the lobe 31 will have described a complete revolution and will lift the catch 39 of the tripping arm 32 out of engagement with the member 41, thereby causing the parts to move into the positions shown in Figures 4 and 6 as hereinbefore described; at which time there will appear through the opening 53 of the face plate 54, the words "Change oil." Thereupon, lubrication being effected, the parts may be restored to normal position as above described.

If desired, in place of the literal designation of the need for lubrication or otherwise, as above set forth, there may as is obvious be displayed on the dashboard, instead of said words, a red color or light to indicate that a change of oil is required and a green color or light to indicate where no such lubrication is needed, or there may be employed any display means or mechanism known in the art whereby such change or condition may be indicated through connection with the instrumentalities of my invention hereinbefore described.

By the words "Star wheel" as used in this specification and claims, I desire to be understood as meaning something essentially different from a gear with one or more peripheral teeth designed to mesh with the teeth of an adjacent gear. By such words I wish to be understood as designating not a gear, but a wheel having encircling its periphery projecting contact fingers equally spaced and arranged to advance a predetermined distance the partial rotation of said wheel through an impulse acting upon successive fingers at regular and recurrent intervals when the vehicle is moving at a constant speed.

My invention may be embodied in other specific forms without departing from the spirit or essential characteristics thereof. The present embodiment is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In an indicator for lubrication of motor vehicles, the combination of an odometer, a drive shaft for operating said odometer, a star wheel, a support for said star wheel, gear mechanism actuated by said drive shaft to effect a complete rotation of said star wheel during the registration of a predetermined number of miles on said odometer, said mechanism being provided with a gear member having a pin for actuating said wheel, and means for indicating the need for lubrication at each completed rotation thereof.

2. In an indicator for lubrication of motor vehicles, the combination of an odometer, a drive shaft for operating said odometer, a star wheel, a support for said star wheel, gear mechanism actuated by said drive shaft to effect one complete rotation of said wheel during the registration of a predetermined number of miles on said odometer, and automatic tripping means releasing said mechanism from its operation of said star wheel at the completion of each successive rotation thereof.

3. In an indicator for lubrication of motor vehicles, the combination of an odometer, a drive shaft for operating said odometer, a star wheel, a support for said star wheel, a cam connected to said wheel, a gear train actuated by said drive shaft, said train being provided with a gear member having a pin for effecting one complete rotation of said wheel during the registration of a predetermined number of miles on said odometer, and releasing means actuated by said cam for automatically throwing said gear train out of connection with said star wheel at the completion of each successive rotation thereof.

4. In an indicator for lubrication of motor vehicles, the combination of an odometer, a drive shaft for operating said odometer, a star wheel, a support for said star wheel, gear mechanism actuated by said drive shaft, said mechanism being provided with a gear member having a pin which effects one complete rotation of said wheel during the registration of a predetermined number of miles on said odometer, mechanism for indicating need for lubrication at each complete rotation of said wheel, and manual means for resetting said mechanism after said indication has been accomplished.

5. In an indicator for lubrication of motor vehicles, the combination of an odometer, a drive shaft for operating said odometer, a star wheel, a support for said star wheel, a cam connected with said wheel, a gear train actuated by said drive shaft, said train being provided with a gear member having a pin for effecting one complete rotation of said wheel during the registration of a predetermined number of miles on said odometer, tripping mechanism arranged to be released by said cam for automatically throwing said gear train out of connection with said wheel at the completion of each successive rotation thereof, and plunger means for resetting said mechanism.

6. In an indicator for lubrication of motor vehicles, the combination of a frame, a drive shaft mounted upon said frame for operating an odometer, a star wheel, a support for said star wheel secured to said frame, an arm pivotally mounted upon said frame, and carrying a display plate indicating need for lubrication, a cam connected with said wheel, a gear train mounted upon said frame and actuated by said drive shaft and effecting one complete rotation of said wheel during the registration of a predetermined number of miles on said odometer, releasing mechanism mounted upon said frame and actuated by said cam for automatically throwing said gear train out of connection with said star wheel at the completion of each rotation thereof and causing said arm and said display plate to move into a position where said display plate may be observed, and means for resetting said mechanism and display plate after said observation has been made.

7. In an indicator for lubrication of motor vehicles, the combination of a frame, a drive shaft mounted upon said frame for operating an odometer, an arm pivotally mounted upon said frame, a display plate carried by said arm and indicating need for lubrication, a gear train mounted upon said frame and actuated by said drive shaft and connected to move said plate into observable position after a predetermined number of miles, automatic mechanism mounted upon said frame for releasing said gear train from its connection with said plate upon said plate being moved into said position and manually operated plunger means for thereafter restoring said parts to their initial operative positions.

8. In an indicator for lubrication of motor vehicles, the combination of a frame, a drive shaft mounted upon said frame for operating an odometer, a V-shaped arm pivotally mounted upon said frame, a display plate secured to one branch of said arm, a gear train mounted upon said frame, and actuated by said shaft and connected with the other branch of said arm so as to turn said plate into observable position, automatic means for releasing said gear train from its connection with said arm after the movement of said plate, and manually operated plunger means for resetting said parts after observation of said plate has been accomplished.

DONALD D. COLEE.